United States Patent
Arce

(10) Patent No.: US 11,406,209 B2
(45) Date of Patent: Aug. 9, 2022

(54) DRINKWARE WITH A NOVEL RIM

(71) Applicant: Charlotte Arce, Schiller Park, IL (US)

(72) Inventor: Charlotte Arce, Schiller Park, IL (US)

(*) Notice: Subject to any disclaimer, the term of this patent is extended or adjusted under 35 U.S.C. 154(b) by 0 days.

(21) Appl. No.: 16/926,256

(22) Filed: Jul. 10, 2020

(65) Prior Publication Data
US 2021/0007521 A1 Jan. 14, 2021

Related U.S. Application Data

(60) Provisional application No. 62/873,739, filed on Jul. 12, 2019.

(51) Int. Cl.
*A47G 21/14* (2006.01)
*A47J 43/28* (2006.01)
*A47G 19/22* (2006.01)
*A47G 21/04* (2006.01)

(52) U.S. Cl.
CPC ....... *A47G 21/145* (2013.01); *A47G 19/2205* (2013.01); *A47G 21/04* (2013.01); *A47J 43/28* (2013.01)

(58) Field of Classification Search
CPC .. A47G 21/145; A47G 19/2005; A47G 21/04; A47G 2200/10; A47G 19/22; A47J 43/28; A47J 43/283; A47J 43/284
USPC .......................................................... 220/574
See application file for complete search history.

(56) References Cited

U.S. PATENT DOCUMENTS

| | | | | |
|---|---|---|---|---|
| 344,567 | A * | 6/1886 | Coleman | A47G 19/2222 215/391 |
| 655,413 | A * | 8/1900 | Parkyn | A61N 2/02 600/9 |
| 1,991,871 | A * | 2/1935 | Sindler | A47G 21/023 294/61 |
| 2,070,976 | A * | 2/1937 | Petersen | A47G 21/023 294/61 |
| 2,255,750 | A * | 9/1941 | Whorton | A47J 19/02 100/133 |
| D184,335 | S * | 2/1959 | Bergeron | D7/684 |
| 2,885,134 | A * | 5/1959 | Cohen | B65D 1/265 229/400 |
| D192,338 | S * | 3/1962 | Farber | D7/684 |
| 3,225,915 | A * | 12/1965 | Wise | B65D 51/246 206/568 |
| 3,772,809 | A * | 11/1973 | Schneller | G09F 23/06 40/637 |
| 4,247,016 | A * | 1/1981 | Shaw | A47G 21/18 220/708 |
| 4,483,622 | A * | 11/1984 | Muhi | A47G 19/22 366/129 |
| 4,602,557 | A * | 7/1986 | Yip | A47G 19/22 206/0.5 |

(Continued)

*Primary Examiner* — Ernesto A Grano
(74) *Attorney, Agent, or Firm* — Haynes and Boone, LLP; William B. Nash; Alexander Lutzky

(57) ABSTRACT

The following invention creates a new line of tableware including disposables with at least one small notched, cavity opening or clip-on reserved for food, liquid and items. This tableware will become known as Buddyware™, Notch Top™ in which allows users to hold their food or items such as decorative or favorite objects, accessories, cocktail picks, magnetic cocktail picks, so that they never have to eat alone and where they'll never lose another olive or garnishes and pets will not need to eat off the floor.

18 Claims, 7 Drawing Sheets

(56) References Cited

U.S. PATENT DOCUMENTS

| | | | | |
|---|---|---|---|---|
| 4,632,347 | A * | 12/1986 | Jurgich | A47G 21/145 211/70.6 |
| 4,830,204 | A * | 5/1989 | Lin | A47G 19/2266 215/389 |
| 5,337,766 | A * | 8/1994 | Lane | A47G 21/00 132/321 |
| 5,386,840 | A * | 2/1995 | Lane | A47G 21/00 132/321 |
| 5,477,978 | A * | 12/1995 | Lo | B65D 77/283 206/217 |
| 5,484,065 | A * | 1/1996 | Davoli, Jr. | A47K 1/09 211/2 |
| D413,051 | S * | 8/1999 | Torelli | D7/684 |
| 6,054,159 | A * | 4/2000 | Manzone | A23G 3/50 248/539 |
| 6,168,042 | B1 * | 1/2001 | Kalagian | B65D 21/0233 206/217 |
| 6,308,718 | B1 * | 10/2001 | Pearson | A61C 15/02 132/329 |
| 6,398,063 | B1 * | 6/2002 | Sternick | A47G 21/145 211/70.7 |
| 6,722,523 | B2 * | 4/2004 | Sternick | A47G 21/145 211/70.7 |
| D547,120 | S * | 7/2007 | Brenner | D7/396.3 |
| D574,259 | S * | 8/2008 | Rosskamp | D9/720 |
| 8,464,896 | B2 * | 6/2013 | Beary | A47G 19/2222 220/709 |
| 8,733,582 | B2 * | 5/2014 | Fioritto | B65D 51/246 220/708 |
| 8,807,610 | B2 * | 8/2014 | McCartor | A47G 21/023 294/61 |
| D713,601 | S * | 9/2014 | Fahsel | A61C 15/02 D28/65 |
| D777,539 | S * | 1/2017 | Gaudet, II | D7/683 |
| D779,880 | S * | 2/2017 | Heo | D7/509 |
| 10,143,318 | B2 * | 12/2018 | Shaffer | A47G 19/06 |
| 10,390,641 | B1 * | 8/2019 | Huynh | B65D 21/086 |
| D869,917 | S * | 12/2019 | Zemel | D7/683 |
| 2005/0249844 | A1 * | 11/2005 | Rosskamp | A23L 19/03 426/115 |
| 2006/0021233 | A1 * | 2/2006 | Lin | A47J 43/287 30/324 |
| 2006/0021989 | A1 * | 2/2006 | Friedman | A47G 19/22 220/703 |
| 2008/0128429 | A1 * | 6/2008 | Towery | A47G 19/2227 220/574 |
| 2008/0245293 | A1 * | 10/2008 | Fosmire | A47G 19/22 118/13 |
| 2011/0062160 | A1 * | 3/2011 | Vasic | A47G 19/2205 220/483 |
| 2011/0241363 | A1 * | 10/2011 | McCartor | A47G 21/023 294/61 |
| 2012/0061409 | A1 * | 3/2012 | Fioritto | B65D 77/286 220/708 |
| 2012/0181310 | A1 * | 7/2012 | McCarthy | A45F 5/00 224/148.1 |
| 2012/0205389 | A1 * | 8/2012 | Beary | A47G 19/2222 220/708 |
| 2013/0048827 | A1 * | 2/2013 | Meier | B65D 25/205 248/682 |
| 2014/0102118 | A1 * | 4/2014 | Kana | F25C 1/00 62/66 |
| 2015/0251812 | A1 * | 9/2015 | Gillie | B65D 25/10 248/683 |
| 2016/0249765 | A1 * | 9/2016 | Perrin | A47J 31/41 222/129.4 |
| 2016/0278555 | A1 * | 9/2016 | Taormina | A47G 19/2205 |
| 2017/0121075 | A1 * | 5/2017 | Gonzalez | B65D 51/246 |
| 2017/0209002 | A1 * | 7/2017 | Scarpati | A47J 43/22 |
| 2018/0099231 | A1 * | 4/2018 | Schwartz | A63H 33/046 |
| 2019/0117000 | A1 * | 4/2019 | Lockhart | B65D 1/265 |

* cited by examiner

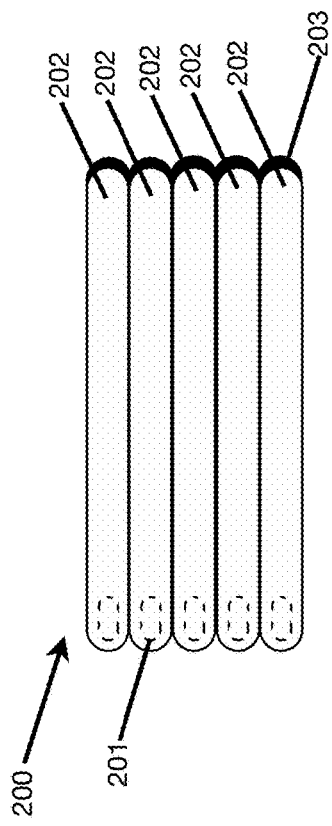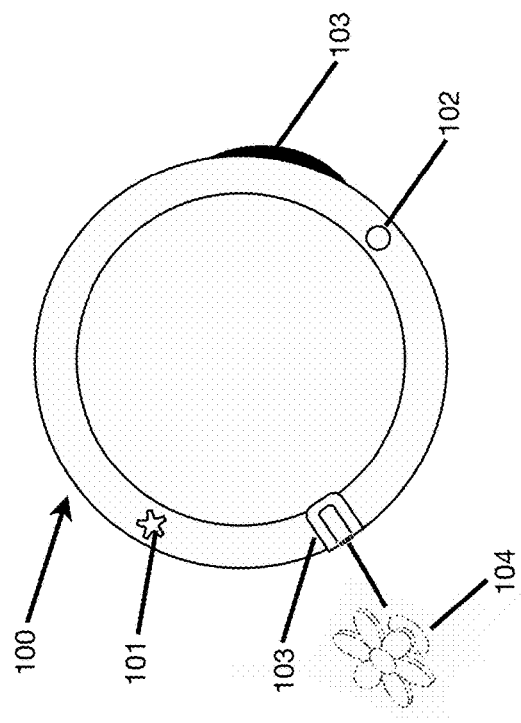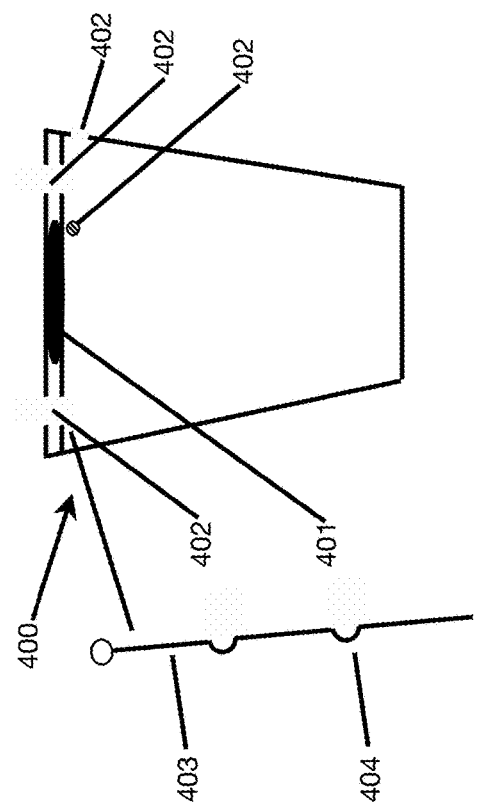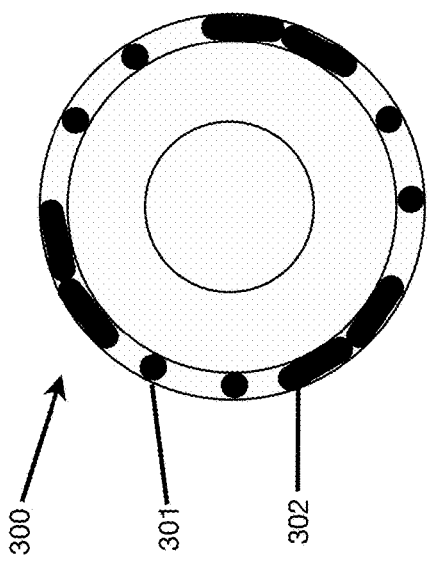

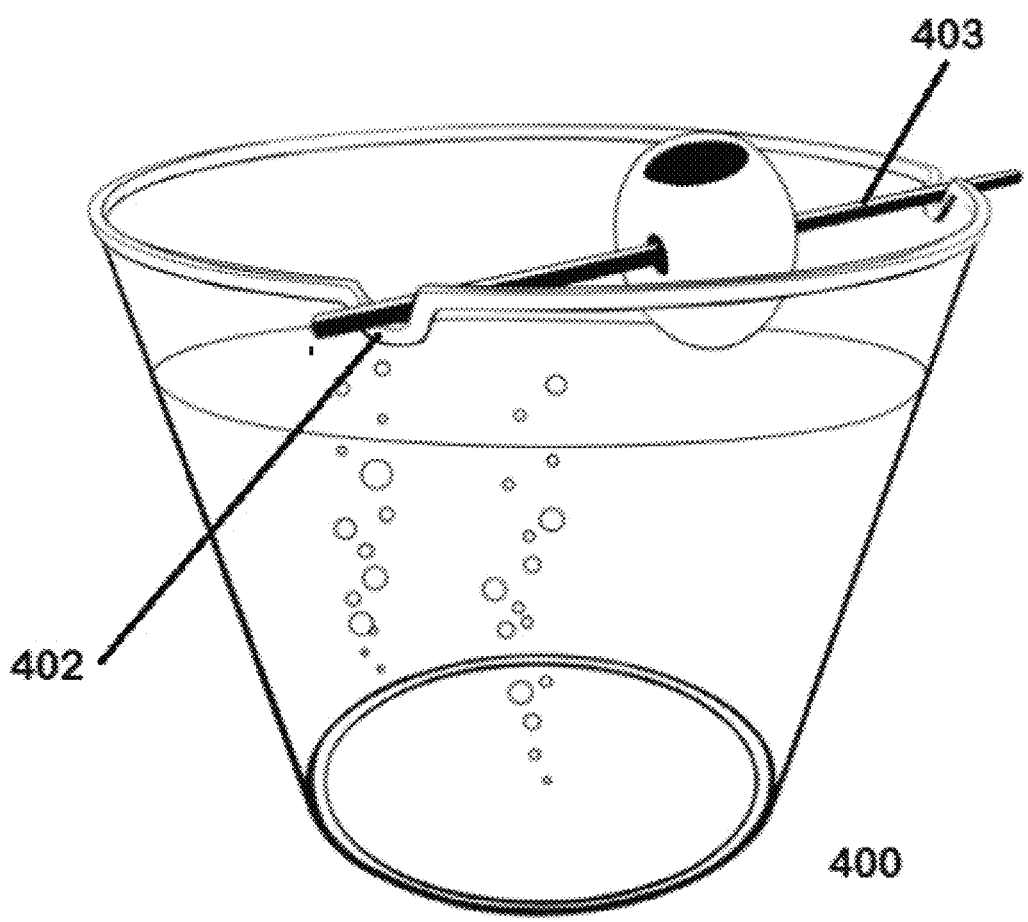

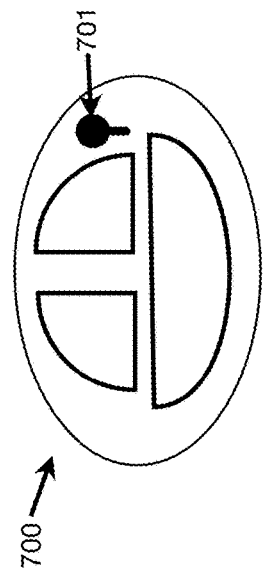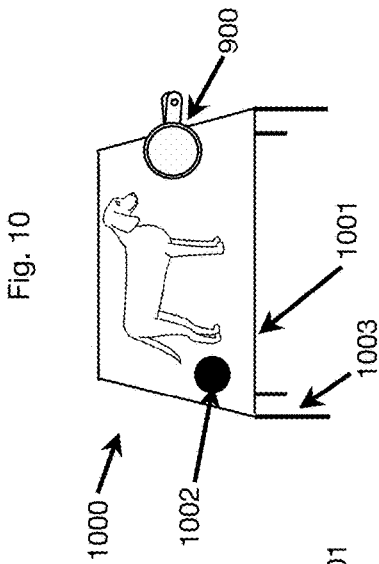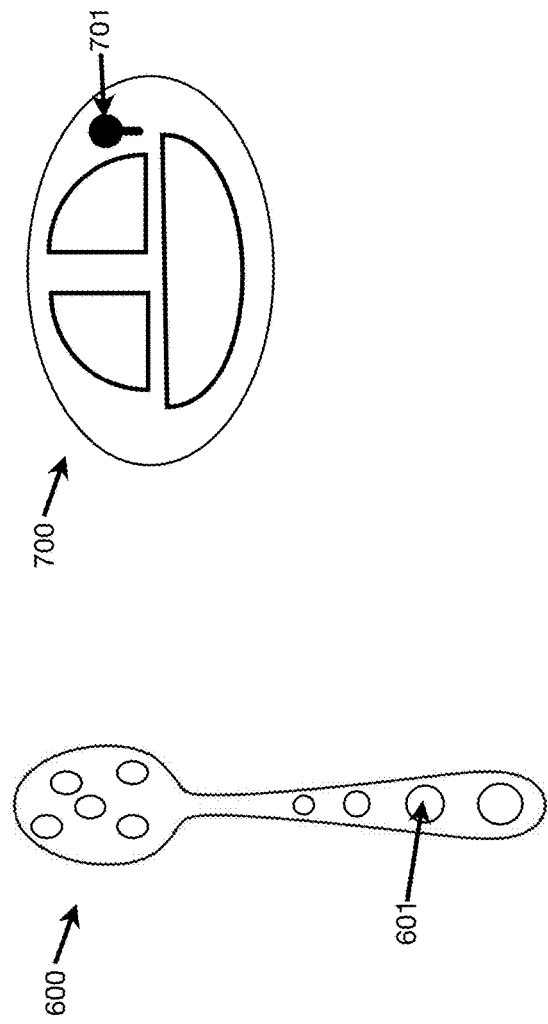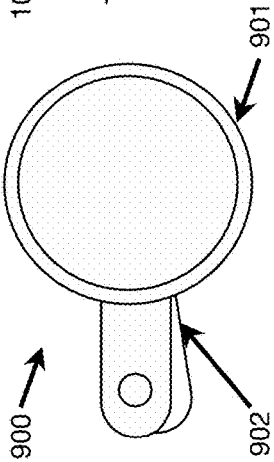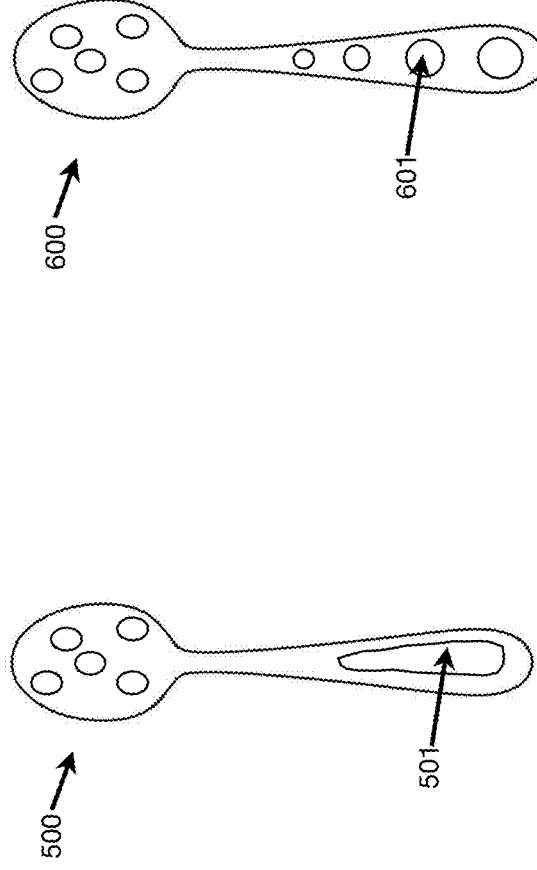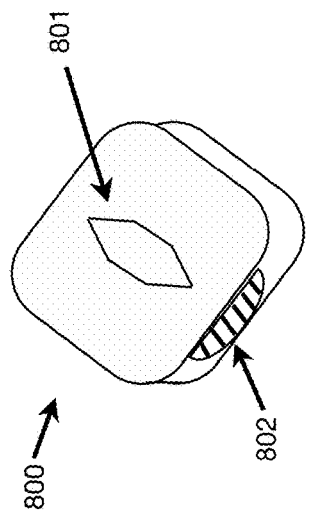

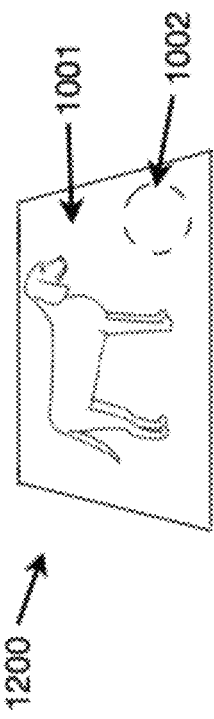
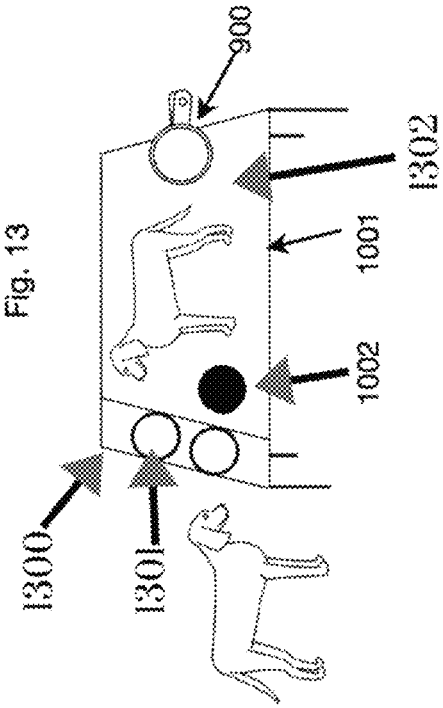
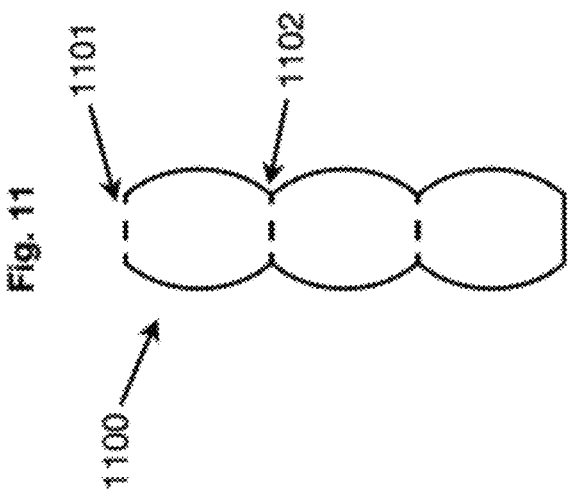

DRINKWARE WITH A NOVEL RIM

CROSS-REFERENCE TO RELATED APPLICATIONS

This application claims the benefit of U.S. provisional application Ser. No. 62/873,739 filed Jul. 12, 2019, and entitled "Tableware for People and Pets," the disclosure of which is herein incorporated by reference in its entirety.

BACKGROUND OF THE INVENTION

1. Field of the Invention

The following invention creates a new line of tableware including disposables with at least one small notched, cavity opening or clip-on reserved for food, liquid and items. This tableware will become known as Buddyware™, Notch Top™ in which allows users to hold their food or items such as decorative or favorite objects, accessories, cocktail picks, magnetic cocktail picks, so that they never have to eat alone and where they'll never lose another olive or garnishes and pets will not need to eat off the floor.

Tableware that may contain at least one small cavity or notch opening and may also be applied a fragrance spot treated to any desired surface, specifically to edges. Tableware may either be acrylic, plastic, metal, paper, silicone or some other material and may be disposable; all may have magnetic properties.

Tableware, also known as dinnerware, are categorized into at least several basic service types: serve ware (spoons, forks, knives etc.), dinnerware, flatware or silverware, drink ware and glassware. They are used anywhere from daily to special events. Tableware also includes toddlers bibs, toddlers suction tableware, and toddlers training tableware.

Infant and toddler suction training "all in one" tableware which houses the tableware into a placemat which suctions to flat surfaces to reduce tipped tableware. Cup handles may have a cavity opening.

The tableware may be applied a fragrance spot treated to any desired surface. It may also be applied solely to the edge and may be spot placed at edges. Fragrance may be of a solvent free edible microencapsulated fragrance oil or solvent free edible essential oil. The fragrance may contain a flavor. The tableware may have at least one cavity opening or notch to hold unlimited objects such as accessories, decorative object, skewer magnetic cocktail sticks, a vitamin, a flavor. The decorative object is unlimited. Alternatively, an adapter will hold the accessory and or other objects so to be attached to tableware. The adapter secures the accessory or other objects into a clip so to be clippable to tableware.

Users can attach decorative accessories or charms to tableware by use of notches, cavity openings and magnetic cocktail picks. Adding magnetic properties to cocktail picks would also allow easy mass storage as simple as storing on a refrigerator or storage on a notched drinkware that sits in a shelve. The magnetized cocktail picks would all magnetize to one another. Decorative charms use magnetic backing, a press fit design, or any other known attachment method. A magnetic attachment would allow quick storage of decorative accessory for example to the magnetic part of the refrigerator between washings.

One embodiment of the present invention relates to tableware, including disposable food party containers that may have an edible solvent free fragrance or essential oil, spot treated at the surface or only at least one edge and more specifically, to a single tableware container or a stack of tableware containers using a reclosable bag to seal said fragrance and provide further protection against release of said fragrance prior to use.

The present invention can be used with all types of tableware including paper plate holders, party plates, paper plates, disposable party cups or pet tableware. As shown in FIG. 4, small cavity opening(s) can be used to hold decorative objects or garnishes. The small cavity openings or notches would hold garnish such as olives, fruits, lemon, lime, herbs, etc. The openings or notches described herein are useful for cocktail drinks such as margaritas, daiquiri, martinis, etc. in which such objects would be held in place by using an object such as a cocktail stick or skewer pick, magnetized and non magnetized 403 in which contains at least one stop notch 404 not allowing it to fall off or fall into the drink or need to set it aside. The notched cavity openings 402 allow the consumer to have the decorative object (cocktail skewer) to securely sit in place on the rim area 402. Also, cavity hole openings 402 allow for decorative object to sit in place under the rim area.

Another embodiment of the present invention allows for attaching decorative objects to non wearable items such as tableware, including non-disposable and disposable tableware. The decorative object may have magnetic components which allows the user to quickly attach and remove from tableware between washing of tableware. The tableware's magnetic attachment will allow for quick removal and storage, such as being capable of being attached to refrigerators between tableware washings.

Another embodiment of the invention is the tableware allows for use of at least one magnetic region 104 in which would be paired up with a tableware magnetic accessory 104.

In recent times, the alternative care practitioners have treated their patients with use of essential oils. It became apparent that the use of essential oils can affect the brain wave patterns in human beings becoming mood altering. The present invention's use of pure solvent free edible essential oils, fragrances, and/or flavors are stimulating to enhance appetite and encourage eating and reduce nauseousness. One example of a flavor used in this way is grapefruit. These types of essential oils would be applied to the tablewares at least one edge.

Another embodiment of the present invention allows for use of its cavity opening(s) to hold decorative objects such as a tableware magnetic accessories. For example, FIGS. 5 and 6 show non disposable and disposable tableware/serve ware that may include: plates, bowls, spoon, fork, knife; etc. in which will allow to hold at least one decorative object. A tableware magnetic accessory may be helpful for fussy kids to eat their food and have fun doing it.

The present invention is not limited to tableware that may contain at least one magnetic region or one cavity or notch opening or clip-on. For example, other non wearable classifications such as photo frames or toothbrush may have at least one magnetic region or cavity opening to also hold a decorative object. For example: The decorative object may be a kid's favorite charm, a tableware magnetic decoration that may be used to help motivate the kid to brush his teeth.

Another embodiment of the present invention allows for use of a spring adapter u-clip with a magnetic back or converter to hold a charm or other decorative objects so to change its form so that the charm would be able to clip in place onto tableware, both non disposable and disposable as shown or similar to FIG. 8 in which would not be limited to tableware where such type adapters would allow the charm and or other decorative objects to become magnets, game pieces for game board and other forms of use.

Alternatively, the charm will have magnetic components in which allows tableware to be sandwiched between its components.

Tableware often gets washed after its use. A magnetic attachment for decorative items allows for quick removal of the decorations between washings of the tableware.

Another embodiment of the present invention is use of an adapter that will hold the decorative objects so to be attached to tableware.

Another embodiment of the present invention is where the tableware accessory would be magnetic.

Another embodiment of the present invention allows for infant/toddler tableware FIG. 7, 700 which includes a silicone suctionable placemat that may also be magnetic in which for example would be magnetizable to a highchair magnetic table or a magnetic sticker that would be applied to a surface such as the highchair table. This would allow the infant tableware to stay in place without the toddler throwing it to the floor. The infant/toddler tableware may have at least one magnetic region 701 to hold tableware magnetic decorative objects in the interests of children. The tableware's silicone placemat may have a recessed area within the cavity opening or notched opening 701 for attaching decorative objects.

Additional benefits of using edible pure essential oil non solvent is insect repellent.

Another embodiment of the present invention allows for use of cup, bowl, plate being a clip-on. As an example, a clip-on bowl could be used to clip on and stay in place on an elevated dog bed so that dogs would have access to their food close by, or be used for infants and those with disabilities. The clip-on tableware may be magnetic so that the tableware would be magnetized to the clip-on's surface.

The current art's pet bowls are on the floor or ground in which ants and other bugs typically find their way to the pet's food. The pet tableware described herein takes the pet's feed zone to a higher level from the floor to a portable elevated platform. The platforms removable material as shown in FIG. 10 as 1001 or 1002 makes easy cleanup for the pet's owner when needed.

Another embodiment of the present invention creates an elevated pet feed platform as seen in FIG. 10 alleviating the need for pets from eating from the floor level where ants, and other bugs may be. The elevated pet bed's fabric or mat cover would have a designated magnetic area that would pair up to a magnetic bottom feeding bowl, cup, plate so that it would stay in place. Alternatively, the designated feed area would be made formed into the silicone mat. In addition, the elevated pet platform is a space saver allowing for pet food storage under the platform. The portable elevated feed space saver platform is great for the outdoors and great for messy pet eaters.

Another embodiment of the present invention creates a two sided pet feed and sleep mat pad as seen in FIG. 12 in which has an unlimited amount of uses including it can be used for crates, kennels, beds, elevated cot frames where materials are unlimited and may include it being self cooling, waterproof, silicone, cushion, gel, microfiber, memory foam where the pet mat pad contain designed magnetic components that has unlimited methods of its manufacturing including that it may either be sandwiched within the pet mat pad materials, manufactured on its top surface or it may be a magnetic sticker with a magnetic bowl that is packaged with the pet mat pad. The feed bowl may be formed into the silicone side of the pet mat pad. The pet mat pad may be two sided where one side is used for the sleep purposes and the other side is used for feeding purposes or may be a single side serving both purposes.

Another embodiment of the present invention creates a portable pet elevated feed platform per FIG. 13, 1300 in which shows an angle of a top view in which the frame 1001 is made out of any materials including metal and where there is a designated open area within the frame 1301 and or fabric 1302 to place at least one bowl giving pets the opportunity to eat their food standing on the floor or standing on the platform and allowing at least two pets simultaneously eating from the food bowls facing in opposite directions or facing the same direction. Framed dog bowl holder 1301 may be adjustable for different heights. 1300 is a space saver allowing for pet food storage under the feed platform. The portable elevated feed space saver platform is great for the outdoors and great for messy pet eaters.

2. Description of the Related Art

Disposable tableware, paper plate holders, food containers have been used for temporarily holding foods for human consumption. Food disposable containers have mostly been shrink wrapped and not allowing the user to re-package or reseal the same food containers in the same packaging that it was bought in so to allow convenience for the consumer.

Flavored pre-rimmed party cups have been used for margaritas and for other fruity beverages where the sugar and flavor have been applied to the entire full rim area in which is highly costly to the average consumer.

The prior art did not teach that a full rim application was not required. As described herein, a full rim application is not needed, is useless and where spot application would be the preferred method and would be a substantial savings in the costs of materials that can be passed on to the consumer. The spot application would be at least one spot location to the rim area.

The prior art did not teach at least one small cavity opening near the non-disposable and disposable cup's rim area that would hold either a decorative object, cocktail stick, skewer, sticker, garnish or any other object. The prior art does not teach magnetic properties to cocktail picks that hold garnishes for drinks.

The prior art in general, non-disposable and disposable party cups, glasses have been used to hold unlimited amount of a wide variety of cocktail drinks such as martinis, daiquiri, margaritas, etc. in which their decorative garnishes have fallen off onto the floor, table or in the drink itself and cocktail picks/skewer picks have fallen into the drinks. Sometimes they are placed on a napkin. Even with the use of toothpicks holding such garnishes, the garnishes have still fallen off. Some garnishes, are cherries, pineapple, strawberries, lime, lemon, spices and olives, but the invention is not limited to use with these specific garnishes.

The current art does not teach cocktail/skewer picks with arches that act as stops so to help the picks stay in place on top of the tableware cups.

The small cavity openings or notch will allow the consumer to efficiently sip with the garnish intact without the garnish falling off.

The small cavity openings or notch will allow the consumer to efficiently sip with the garnish intact without the garnish drowning itself in the drink.

Current art leaves the consumer needing to place the garnish on a napkin or set aside because the garnish just does not sit in place, sometimes falling in the drink itself.

The prior art does not teach a cavity opening, notch, nor a magnetic region in tableware/serve ware so to hold a decorative object or any object.

The prior art does not teach use of a spring magnetic adapter to hold a decorative object or a tableware magnetic accessory with a magnetic back, decorative object or any object that may be easily clipped specifically to tableware or serveware and where such tableware magnetic accessory and magnetic adapter spring clips easily stores in locations such as a refrigerator door between tableware washings.

The prior art does not teach a portable pet feeding platform with fabric magnetic properties to secure magnetic tableware. The prior art has taught an elevated pet bed. The prior art does not teach the elevated pet bed being a space saver for pet food storage.

The prior art does not teach a portable pet feeding platform with at least one opening within the platform frame in which at least one pet bowl may be adjustably placed and where options are given to a pet to either eat at floor level or to eat at an elevated level as well. In addition, the prior art does not teach that at least two pets may eat either facing one another or facing in the same direction but at two different height levels where one is on the platform and the other is on the floor.

SUMMARY OF THE INVENTION

Accordingly, one object of the present invention is to provide the consumer a mood effect which allows the consumer to have an experience while eating by applying a fragrance and/or flavor to tableware and/or including one or more cavity openings in tableware for attaching an accessory or accessories, where the accessory may be attached magnetically, using a spring u-clip, and/or press fitting.

A second object of the present invention is to provide the consumer a mood effect which allows the consumer to have an experience to use of the benefit of having at least one small cavity or notch near the rim area, of holding a decorative object, magnetic or non magnetic cocktail pick or skewer, sticker or garnish. To aide even better, the cocktail pick or skewer 403 with stop arches 404 allows the consumer to help maintain the pick in place, specially while walking with their drinks. The object is not limited to what the small cavities or notches can hold.

Another object of this invention allows for consumers to experience simpler storage methods for cocktail picks that are magnetized together in which they then may be magnetized to any surfaces such as refrigerators and even to the notches and cavities of the tableware.

The use of the small cavity openings 402 hole and or notch would allow holding a cocktail skewer pick and magnetic cocktail picks with garnishes in place stopping the garnishes from falling out of place. The small cavity opening will allow the consumer to efficiently sip with the garnish intact without falling out of place and remaining to be decorative. Alternatively, the arched stops 404 in the 403 cocktail pick also aides in helping to keep the pick in place, especially during walking. The current art leaves the consumer needing to place the garnish on a napkin or set aside because the garnish just does not sit in place, sometimes falling in the drink itself.

A third object of the present invention is to provide a mood experience which allows the consumer to contain the fragrance- and or flavor-treated disposable food containers in a reclosable bag to seal said fragrance and or flavor that provides protection against said fragrance and or flavor for later use.

The fourth object of the present invention is to provide a mood experience using the tableware cavity opening or notch to hold a kid's favorite accessory or decorative objects to help in encouraging kids to eat their food and where objects are unlimited and used for a wide variety of occasions.

A fifth object of the present invention is providing magnetic spring adapters for existing charms that may be used for tableware.

Another embodiment of the present invention creates an elevated pet feed platform as seen in FIG. 10 alleviating the need for pets from eating from the floor level where ants, and other bugs may be. The elevated pets bed's fabric or mat cover would have a designated magnetic area that would pair up to a magnetic bottom feeding bowl, cup, plate so that it would stay in place. Alternatively, 1001 and or 1002 may be a removable tableware silicone mat for this elevated pet feed platform allowing for easy cleanup for messy pet eaters. In addition; the elevated pet platform is a space saver allowing for pet food storage under the platform. The portable elevated feed space saver platform is great for the outdoors and great for messy pet eaters.

Another embodiment of the present invention creates a two sided pet feed and sleep mat pad as seen in FIG. 12 in which has an unlimited amount of uses including it can be used for crates, kennels, beds, elevated cot frames where materials are unlimited and may include it being self cooling, waterproof, silicone, cushion, gel, microfiber, memory foam where the pet mat pad contain designed magnetic components that has unlimited methods of its manufacturing including that it may either be sandwiched within the pet mat pad materials, manufactured on its top surface or it may be a magnetic sticker with a magnetic bowl that is packaged with the pet mat pad. The feed bowl may be formed into the silicone side of the pet mat pad. The pet mat pad may be two sided where one side is used for the sleep purposes and the other side is used for feeding purposes or may be a single side serving both purposes.

Another embodiment of the present invention creates a portable pet elevated feed platform per FIG. 13, 1300 in which shows an angle of a top view in which the frame 1001 is made out of any materials including metal and where there is a designated open area within the frame 1301 and or fabric 1302 to place at least one bowl giving pets the opportunity to eat their food standing on the floor or standing on the platform allowing at least two pets simultaneously eating from the food bowls facing in opposite directions or facing the same direction. Framed dog bowl holder 1301 may be adjustable for different heights. 1300 is a space saver allowing for pet food storage under the feed platform. The portable elevated feed space saver platform is great for the outdoors and great for messy pet eaters.

BRIEF DESCRIPTION OF THE DRAWINGS

FIG. 1 shows a top view of a tableware that may be disposable and edge scented and include openings for attaching decorative objects.

FIG. 2 is a cross-sectional side view of a stack of fragrance tableware; disposable food containers like the container shown in FIG. 1.

FIG. 3 is a top view of tableware that may be disposable and fragrance and or flavor disposable food party container cup.

FIG. 4 is a front view of a cocktail pick, a magnetic cocktail pick with tableware or disposable food party container, party cup with at least one cavity opening and or notch that may also be spot treated with fragrance and or flavor. 402 may also have magnetic properties. FIG. 4c is a front view of a party cup containing liquid and two notches in the rim with a cocktail skewer.

FIG. 5 and FIG. 6 both are front view of serve ware with at least one cavity opening. Serve ware may be either a spoon, fork, knife or any object that serves food.

FIG. 7 shows a top view of a silicone suctionable all-in-one tableware placemat 700 with at least one cavity or notched opening 701. Opening may be recessed for tableware decorative objects. The silicone placemat may be magnetic so to stay in place on any magnetic surface including a highchair table in which its surface can be transformed to being magnetic by applying a magnetic sticker to its highchair table surface.

FIG. 8 shows an angle of a top view and side view of a u-clip spring charm adapter that may have magnetic components. The user will insert their favorite charm at time of use so that they can use it on tableware. 801 is cavity opening for placement of charm by consumer. 802 is the spring area allowing for opening or closing onto tableware.

FIG. 9 shows a top view of a pet tableware bowl clip-on.

FIG. 10 1000 shows an angle of top view of a portable pet elevated feed platform using a clip-on tableware 900 to the outer end of its fabric, mat or frame. 1001 is shown as a removable magnetized fabric or mat as illustrated by 1002. The feed platform is supported by four 1003. The feed platform and frame is a space saver allowing for pet food storage underneath. Alternatively; 1002 material may be a removable for easy cleanup from messy pet eaters. This arrangement takes a pet's feed zone to a higher level from the floor to an elevated platform.

Figure 4A:
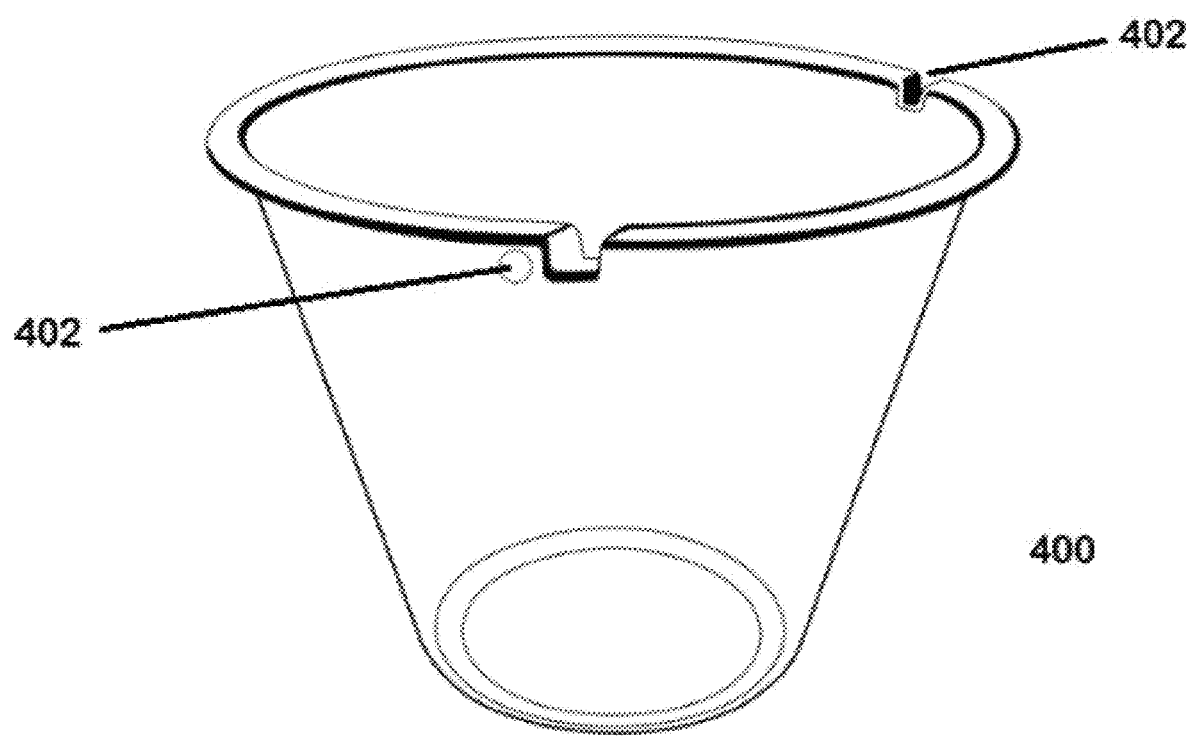
FIG. 4a is a front view of a party cup that includes one or more through holes or notches adjacent to the rim.

The material of 1001 is unlimited and may include it being self cooling, waterproof, silicone, cushion, gel, microfiber, memory foam where the pet mat pad contain designed magnetic components that has unlimited methods of its manufacturing including that it may either be sandwiched within the pet mat pad materials, manufactured on its top surface or it may be a magnetic sticker with a magnetic bowl that is packaged with the pet mat pad.

FIG. 11 shows a front view of notched 1101 tableware with stacking features 1102 which may include magnetic features.

FIG. 12 shows a top view where 1001 material as a two sided pet feed and sleep mat in which the magnetic component 1002 may be either sandwiched within the pet mat pad materials, manufactured on its top surface or it may be a magnetic sticker with a magnetic bowl that is packaged with the pet mat pad. The feed bowl may be formed into the silicone side of the pet mat pad.

The pet mat pad may be two sided where one side is used for the sleep purposes and the other side is used for feeding purposes or may be a single side serving both purposes.

FIG. 13 shows an angle of a top view in which 1300 is a portable pet elevated feed platform where the frame 1001 is made out of any materials including metal and where there is a designated open area anywhere within the frame area similar to 1301 and or fabric 1302 to place at least one bowl giving pets the opportunity to eat their food standing on the floor or standing on the platform allowing at least two pets simultaneously eating from the food bowls facing in opposite directions or facing the same direction. Framed dog bowl holder 1301 may be adjustable for different heights.

DETAILED DESCRIPTION

FIG. 1 shows a top view of a tableware 100 that may be fragranced, disposable and that may have at least one cavity opening 101 or magnetic region reserved for a decorative object such as a keepsake pin, sticker, or a tableware magnetic accessory 104. Alternatively, a magnetic spring adapter 103, which may be U-shaped securely and easily clips in place to the tableware, allowing the display of a decorative ornament 104 inserted into the magnetic adapter. The back of the adapter may be magnetic. The magnetic adapter allows use of existing tableware with decorative objects or other objects to be inserted by use of the adapters own cavity or notched opening.

The tableware of FIG. 1 may also be spot treated with fragrance to at least one surface location 102 and or to at least one edge location 103.

The bottom surface of tableware decoration 104 maybe magnetized, either by the component being a glued magnet or a magnetic layer added over the bottom surface. Alternatively, all the components may be magnetized instead of being glued or molded or high volume 3D printed using magnetized materials. In addition, the shaft of the tableware decoration may be magnetized, eliminating the need to glue it to the bottom surface.

The invention herein is distinguished from existing decorative accessories for wearable items and methods by which those accessories are attached, such as Jibbitz™, in that the invention is for use with non-wearable items, such as tableware, and the invention may be attached using magnetic components and/or an extra layer of magnetic component.

FIG. 2 shows a cross-sectional side view of a stack of fragrance disposable food containers where the disposable food containers 202 have been stacked for the process application of edge spot treatment not limited to edge printing methods, brushing methods automatically machine equipped or manually, including the use of a food grade brush, sponge or other apparatuses.

FIG. 3 shows a top view of a disposable fragrance and/or flavor disposable food party container cup 300 having at least one spot treated 301 and or 302 area with flavor and/or fragrance.

Figure 4B:
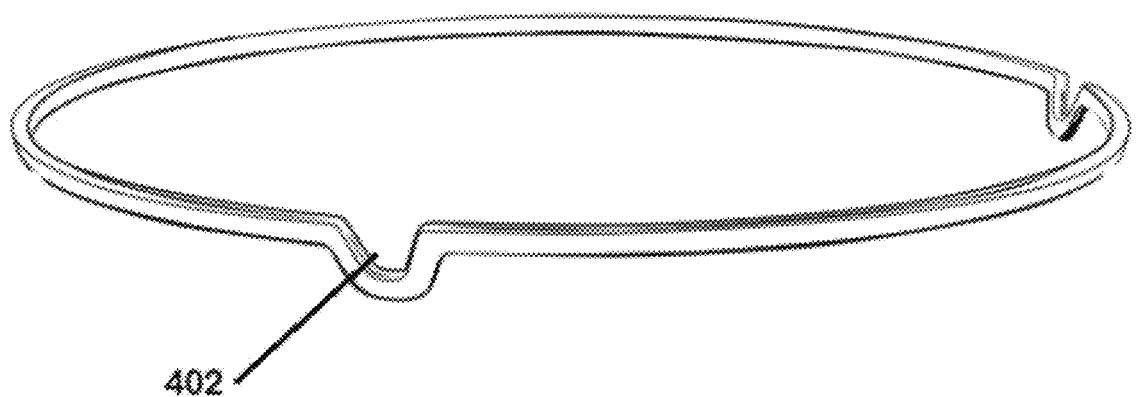
FIG. 4b is a front view of the rim of a party cup with two notches in the rim.
Figure 4D:
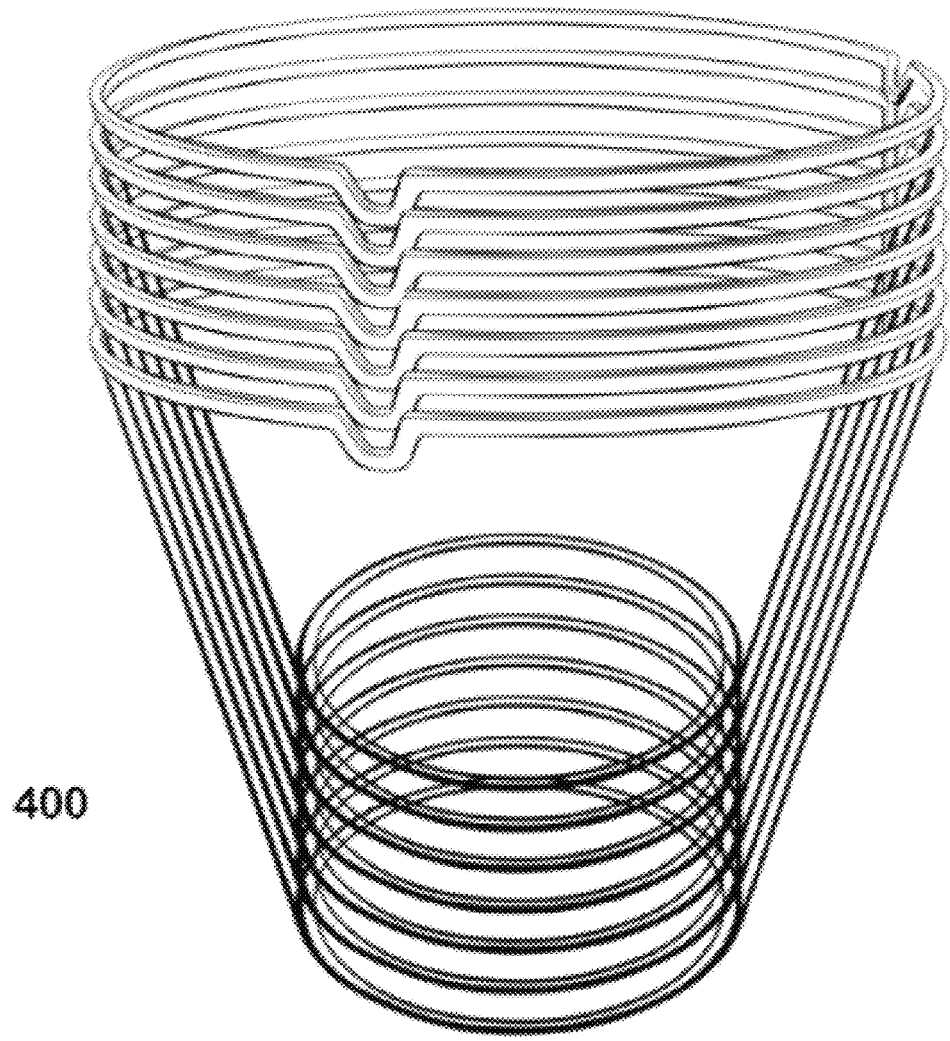
FIG. 4d is a front view of a several party cups with notches in a stacked configuration.

FIG. 4 shows a front view of a cocktail pick or skewer 403, magnetized or non-magnetized with stop arches 404 with tableware or disposable food party container, party cup 400 in which has at least one small cavity opening or notches 402 near the rim area and or at the rim area, and/or at least one spot 401 treated with a fragrance and/or flavor. 402 may also have magnetized properties. FIG. 4a shows an alternate embodiment of a party cup 400 with a rim and a lip that includes one or more small cavity openings or notches 402 near the rim. FIG. 4b shows an alternate embodiment of a rim for a party cup that includes one or more small cavity openings or notches 402 near the rim. FIG. 4c shows an embodiment of a party cup 400 containing liquid with two notches 402 in the rim and a cocktail pick or skewer 403 attached to notches 402. FIG. 4d shows a view of transparent party cups 400 in a stacked configuration for storage.

FIG. 5 shows a top view of a serve ware in which has at least one cavity opening 501.

FIG. 6 shows another top view of a serve ware in which has at least one cavity opening 601.

FIG. 7 shows a top view of a silicone suctionable all-in-one tableware placemat 700 with at least one cavity or notched opening 701. Opening may be recessed for decorative accessories or other objects.

FIG. 8 shows an angle of a top view and side view of a u-clip spring charm adapter that may have magnetic components. The user will insert their favorite charm at time of use so that they can use it on tableware. 801 is cavity opening for placement of charm by consumer. 802 is the spring area allowing for opening or closing onto tableware.

FIG. 9 shows a top view of a pet tableware bowl clip-on.

FIG. 10, 1000 shows an angle of top view of a portable pet elevated feed platform using a clip-on tableware 900 to the outer end of its fabric or frame. 1001 is shown as magnetized fabric or mat as illustrated by 1002. The feed platform is supported by at least four 1003. The feed plat-form and frame is a space saver allowing for pet food storage.

The material of 1001 is unlimited and may include it being self cooling, waterproof, silicone, cushion, gel, microfiber, memory foam where the pet mat pad contain designed magnetic components that has unlimited methods of its manufacturing including that it may either be sandwiched within the pet mat pad materials, manufactured on its top surface or it may be a magnetic sticker with a magnetic bowl that is packaged with the pet mat pad.

FIG. 11 shows a front view of notched 1101 tableware with stacking features 1102 which may include magnetic features.

FIG. 12 shows a top view where 1001 material as a two sided pet feed and sleep mat in which the magnetic component 1002 may be either sandwiched within the pet mat pad materials, manufactured on its top surface or it may be a magnetic sticker with a magnetic bowl that is packaged with the pet mat pad. The feed bowl may be formed into the silicone side of the pet mat pad.

The pet mat pad may be two sided where one side is used for the sleep purposes and the other side is used for feeding purposes or may be a single side serving both purposes.

FIG. 13 shows an angle of a top view in which 1300 is a portable pet elevated feed platform where the frame 1001 is made out of any materials including metal and where there is a designated open area anywhere within the frame similar to 1301 and or fabric 1302 to place at least one bowl giving pets the opportunity to eat their food standing on the floor or standing on the platform allowing at least two pets simultaneously eating from the food bowls facing in opposite directions or facing the same direction. Framed dog bowl holder 1301 may be adjustable for different heights.

What is claimed is:

1. A disposable drinkware apparatus comprising:
    a base comprising a plastic material that defines a liquid containment volume that is configured to contain a liquid in the base;
    a circular rim that extends about a perimeter of the base and that is located immediately adjacent the liquid containment volume;
    two notches that are defined by two cutouts in the rim and that are configured to connect a drinkware accessory to the base at the two cutouts;
    wherein the two cutouts are located 120 degrees apart from each other on the circumference of the circular rim;
    wherein the rim comprises an integrated magnet;
    wherein the drinkware accessory is a magnetized cocktail skewer capable of being held in place at the two cutouts by magnetic force; and
    wherein the base is treated with a fragrance spray capable of providing an odor to a user when the disposable drinkware apparatus is in use.

2. The drinkware apparatus of claim 1, wherein said drinkware accessory is a cocktail pick.

3. The drinkware apparatus of claim 1, wherein said drinkware accessory is a skewer.

4. The drinkware apparatus of claim 1, wherein said drinkware accessory is magnetic.

5. The drinkware apparatus of claim 1, wherein said drinkware accessory comprises an integrated magnet.

6. The drinkware apparatus of claim 5, wherein said drinkware apparatus comprises an integrated magnetic element for retaining said drinkware accessory.

7. The drinkware apparatus of claim 1, wherein said drinkware accessory is capable of attachment by press-fit design.

8. The disposable drinkware apparatus of claim 7, wherein said drinkware accessory is further capable of attachment by a mechanical spring clip.

9. The drinkware apparatus of claim 1, wherein said drinkware apparatus is configured to be stackable.

10. The disposable drinkware apparatus of claim 1, wherein said magnetized cocktail skewer is made of metal and is between 4 and 5 inches in length.

11. A disposable drinkware apparatus comprising:
    a base comprising a plastic material that defines a liquid containment volume that is capable of containing a liquid in the base;
    a circular rim that extends about a perimeter of the base, that is located immediately adjacent the liquid containment volume, and defines an opening in the base;
    a drinkware accessory receiving feature that is defined by two through-holes in the base directly adjacent to the circular rim and that is configured to connect a drinkware accessory to the base;
    wherein the circular rim comprises an integrated magnet;
    wherein the drinkware accessory is a magnetic cocktail pick capable of being magnetically attached to the two through-holes in the base;
    wherein the two through-holes are located 120 degrees apart from each other on the circumference of the base directly adjacent to the circular rim; and
    wherein the base is treated with a fragrance spray capable of capable of providing an odor to a user when the disposable drinkware apparatus is in use.

12. The drinkware apparatus of claim 11, wherein said drinkware accessory is a cocktail pick.

13. The drinkware apparatus of claim 11, wherein said drinkware accessory is a skewer.

14. The drinkware apparatus of claim 11, wherein said drinkware accessory is magnetic.

15. The drinkware apparatus of claim 11, wherein said drinkware accessory comprises an integrated magnet.

16. The drinkware apparatus of claim 15, wherein said drinkware apparatus comprises an integrated magnetic element for retaining said drinkware accessory.

17. The drinkware apparatus of claim 11, wherein said drinkware accessory is capable of attachment by mechanical press-fit.

18. The drinkware apparatus of claim 11, wherein said drinkware accessory is capable of being stack for storage.

* * * * *